March 31, 1953     F. O. LUENBERGER     2,633,392
THRUST BEARING
Filed March 9, 1951
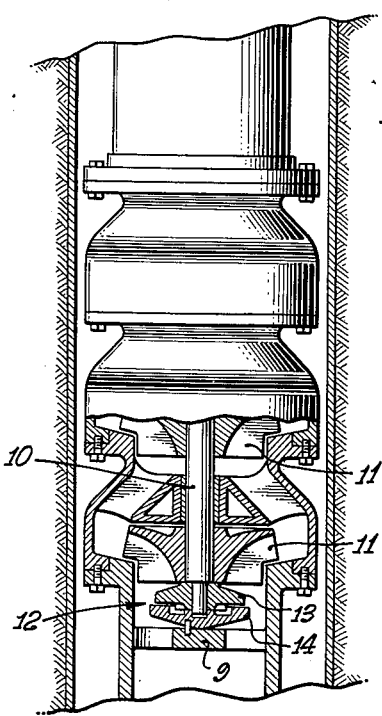
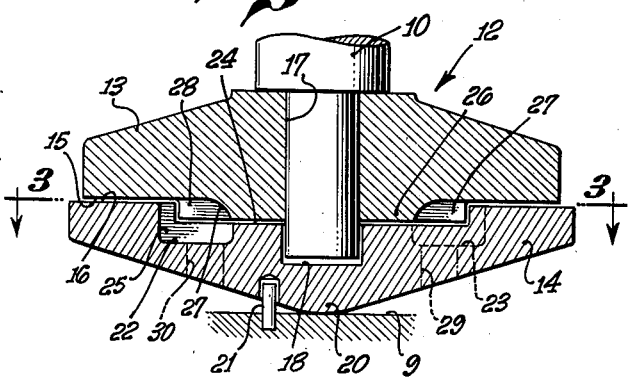
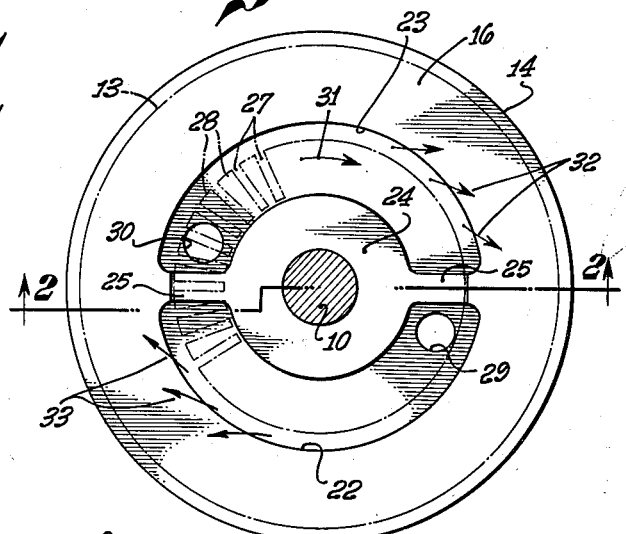
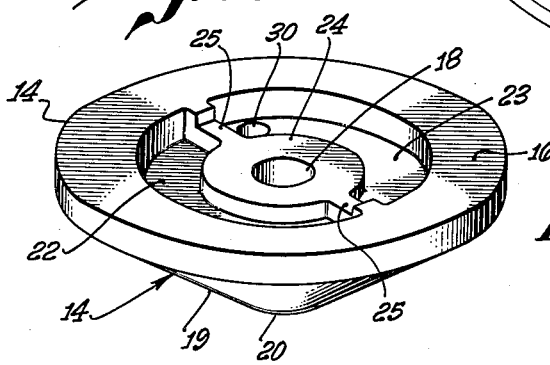
FREDERICK O. LUENBERGER,
INVENTOR.
BY
*John Flam*
ATTORNEY.

Patented Mar. 31, 1953

2,633,392

UNITED STATES PATENT OFFICE 2,633,392

THRUST BEARING

Frederick O. Luenberger, Los Angeles, Calif., assignor to U. S. Electrical Motors, Inc., Los Angeles, Calif., a corporation of California Application March 9, 1951, Serial No. 214,754

8 Claims. (Cl. 308—9)

This invention relates to a bearing structure, and particularly to a thrust bearing utilizing fluid pressure to maintain a proper running clearance for the relatively rotating members.

It is an object of this invention to provide a thrust bearing in which fluid pressure of the fluid acted upon is utilized to maintain a clearance between the cooperating surfaces of the bearing.

It is another object of this invention to provide a bearing structure that is particularly useful in connection with a well pump, utilizing the well fluid as the operating fluid for maintaining the bearing clearance.

It is another object of this invention to provide a simple bearing structure that has but few parts, and which is capable of supporting substantial loads.

It is still another object of this invention to provide a bearing structure that is particularly useful in connection with a well pump, and which needs no independent source of lubrication, thereby minimizing the cost and complexity of the installation.

It is still another object of this invention to provide a simple two-part bearing structure that may be easily and inexpensively manufactured, the construction obviating close tolerances, and also facilitating assembly.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is a view, partly in section, illustrating a pump in which the invention is incorporated;

Fig. 2 is an enlarged sectional view of the bearing structure, taken on a plane corresponding to line 2—2 of Fig. 3;

Fig. 3 is a plan view taken in the direction of the plane corresponding to line 3—3 of Fig. 2, and illustrating the upper rotating portion of the bearing structure in dot-and-dash lines; and Fig. 4 is a pictorial view of the lower or stationary portion of the bearing structure.

In Fig. 1 there is illustrated by way of example, a centrifugal pump structure with which the bearing structure comprising this invention is incorporated. The pump structure includes a conventional rotating shaft 10 carrying appropriate impellers or runners 11. A substantial load, due to the weight of the rotor, is imposed upon this pump shaft 10.

For supporting the pump shaft 10, the bearing structure 12 is interposed between the shaft 10 and a suitable support 9 which may be carried in turn by the pump casing. The bearing 12 is illustrated in detail in Figs. 2, 3, and 4. This structure 12 is immersed in the fluid of the well in which the pump operates.

As shown most clearly in Fig. 2, the bearing 12 comprises a pair of relatively rotating members 13 and 14 having opposed cooperating annular surfaces 15 and 16 respectively. The rotating member 13 is fixedly secured to the shaft 10 for rotation therewith, the rotating member 13 having a centrally located through bore 17 circumscribing a reduced portion of the shaft 10. The shaft 10 extends beyond the rotating member, and is loosely accommodated in a centrally located recess 18 of the stationary member 14. This recess 18 is sufficiently extensive to provide ample clearance for the end of the shaft 10 when the bearing members are coupled.

The stationary bearing member 14 is adapted to be supported in a manner to admit of limited movement of the shaft in order to relieve against undue strains upon the rotating mechanism, while yet providing an effective bearing structure.

For this purpose, the entire bearing structure is adapted to move with the end of the shaft 10, there being provided a loose pivotal type of mounting for the bearing structure. For accomplishing this function, the lower surface 19 of the stationary member 14 has a generally flat conical contour, forming a central apex 20. This apex 20 is rounded, providing a limited area of contact with the support 9 at a location proximate the continuation of the axis of the shaft 10.

A pin 21 limits relative rotation of the stationary bearing member 14 and the support 9. For this purpose it is accommodated in recesses of the members respectively, the recesses being displaced substantially from the area of contact of the members, and providing some clearance for the pin.

In order to maintain a running clearance between the cooperating surfaces 15 and 16 of the bearing members while the apparatus is in operation, use is made of low viscosity fluid under pressure that is continually forced outwardly between the surfaces, thereby lifting and supporting the rotary bearing member 13 and the shaft 10. Conveniently in the installation illustrated in Fig. 1, the fluid for this purpose is the fluid of the well, which may be water.

The bearing structure 12 itself imposes the pressure upon the fluid and forces it outwardly between the surfaces 15 and 16, operating as a vane type pump. For defining pressure chambers for the fluid operating the bearing, the stationary bearing member 14 has a pair of semiannular channels or recesses 22 and 23. The upper edges of the outer walls of these recesses or channels correspond to the innermost edge of the annular surface 16 across which the fluid is designed to flow.

The channels 22 and 23 are separated and defined by a central boss 24 and a pair of ribs or partitions 25 extending diametrically on opposite sides thereof. The boss 24 has an upper surface substantially below the surface 16, and the partitions 25 are of stepped configuration, the level of the boss 24 being thereby continued across part of the width of the channels 22 and 23.

The rotating bearing member 13 has a projection 26 extending into the stationary bearing member 14. This projection or boss 26 is disposed directly above the top edges of the partitions 25. Accordingly, the periphery of this boss 26 overlies a substantial width of the channels 22 and 23. This peripheral portion has a plurality of radial slots 27 forming vanes 28, as shown most clearly in Fig. 3 by the dot and dash lines.

Each of the channels 22 and 23 has an inlet bore 29 or 30 communicating fluid thereto. These bores 29 and 30 are placed at one end of the respective channels such that, upon relative rotation of the bearing members 13 and 14 in a direction illustrated by the arrow 31 of Fig. 3, the vanes 28 impose a pressure on the fluid entering the channels 22 and 23, and, with the aid of the stepped partitions 25 forming a barricade, force it out of the channel at the other end thereof past the cooperating surfaces 15 and 16. Accordingly, the flow of the pressurized fluid maintains a running clearance between the bearing members and thereby supports the shaft 10.

Since there is a plurality of channels (22, 23), the fluid under pressure emerges from the narrow space between surfaces 15, 16 at a plurality of places that are equally spaced around the bearing. This is indicated by the two sets of arrows 32, 33, of Fig. 3, corresponding to the efflux of the fluid. Accordingly, a balanced lifting effect due to fluid pressure is effected.

The inventor claims:

1. In a thrust bearing structure for a rotary device: a lower support member having an upper surface; an upper rotary bearing member having a surface opposed to said upper surface; said surfaces being normal to the axis of movement of said rotary member; one of said members having recesses opening in the corresponding surface; and pumping vanes carried by the other member and extending into the recesses.

2. In a thrust bearing structure for a rotary device: a lower support member having an upper surface; an upper rotary bearing member having a surface opposed to said upper surface; said surfaces being normal to the axis of movement of said rotary member; one of said members having recesses opening in the corresponding surface; said recesses being uniformly spaced around the axis of the bearing and having communication with the exterior of the bearing near one end of each recess; and pumping vanes carried by the other member and extending into the recesses.

3. In a thrust bearing structure for a rotary device: a lower support member having an upper surface; an upper rotary bearing member having a surface opposed to said upper surface; said surfaces being normal to the axis of movement of said rotary member; said lower member having a plurality of recesses opening into the corresponding surface, each recess being in communication with the exterior of the bearing by the aid of an aperture opening into the recess near one end of the recess; and pumping vanes carried by the rotary member and extending into the recesses, the vanes creating an emerging fluid pressure at symmetrically disposed localities around the bearing axis.

4. In a bearing structure: a pair of relatively rotatable members having opposed annular surfaces extending normal to the axis of relative movement of said members, one of said members having means defining a fluid pressure chamber adjoining the annular surface of said one member, and the other of said members having a vane structure communicating with the chamber, said one member having means forming a barricade cooperating with said vane structure, said vane structure together with said barricade forming means being adapted to impose a pressure on the fluid in said chamber to force it between said opposed annular surfaces.

5. In a bearing structure: a pair of relatively rotatable members having opposed annular surfaces extending normal to the axis of relative movement of said members, one of said members having a plurality of arcuately extending recesses adjoining the annular surface of said one member, and forming a fluid pressure chamber, said one member also having an inlet for each of said recesses, the other of said members having a vane structure in communication with said recesses, said one member having means forming barricades separating said recesses and cooperating with said vane structure, said vane structure together with said barricade forming means forcing the fluid out of said recesses and between said opposed annular surfaces.

6. In a bearing structure: a pair of relatively rotatable members, one of said members having an annular flange forming a raised annular surface, said one member also having a central boss defining together with said flange an annular recess, said boss having an upper surface lower than said raised annular surface; a plurality of stepped partitions joining said flange with said boss, dividing said recess into a plurality of arcuately extending channels, said one member having a plurality of fluid inlet ports at one end of said channels respectively and communicating fluid to said channels, the other of said members having an annular surface opposed to said annular surface of said one member, said other member having a projection extending into said one member, the peripheral portion of said projection having vanes cooperating with said channels, said vanes upon relative rotation of said members together with said stepped partitions adapted to force and direct fluid outwardly of said recesses between said cooperating annular surfaces.

7. In a bearing structure adapted for insertion in a liquid: a support, a non-rotary member having on one side thereof a recess for piloting a shaft; said non-rotary member having on the other side thereof a convex surface converging at a rounded apex aligned with said piloting recess; means forming a loose connection between said non-rotary member and said support at a place remote from said apex, said connection permitting limited tilting movement of said non-rotary member on said apex but preventing rotation thereof about said apex; an upper rotary bearing member adapted to be carried by a shaft; one of said members having an open recess; and pumping vanes carried by the other member and extending into said recess for creating a liquid pressure between said members.

8. In a thrust bearing structure: a non-rotary member having an upper annular surface; an upper rotary member having a surface opposed to said upper annular surface; one of said members having a plurality of arcuate recesses adjacent one edge of the said surface of said one member; and stepped walls separating said recesses; pumping vanes carried by the other member and extending into said recesses, and accommodated at the stepped portion of said walls; said one member having inlet ports at one end of the recesses respectively.

FREDERICK O. LUENBERGER.

REFERENCES CITED

The following references are of record in the file of this patent:

UNITED STATES PATENTS

| Number | Name | Date |
|---|---|---|
| 545,238 | La Sueur | Aug. 27, 1895 |
| 2,289,053 | Watres | July 7, 1942 |
| 2,570,682 | Imbert | Oct. 9, 1951 |